United States Patent
Ballard et al.

(10) Patent No.: US 10,040,484 B1
(45) Date of Patent: Aug. 7, 2018

(54) VEHICLE ROOF PANEL ATTACHMENT ASSEMBLY

(71) Applicant: GM Global Technology Operations LLC, Detroit, MI (US)

(72) Inventors: Adam R. Ballard, Chesterfield, MI (US); Robert N. Saje, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/458,370

(22) Filed: Mar. 14, 2017

(51) Int. Cl.
*B62D 25/06* (2006.01)
*B62D 25/02* (2006.01)
*B62D 27/02* (2006.01)
*B62D 25/07* (2006.01)

(52) U.S. Cl.
CPC ............ *B62D 25/06* (2013.01); *B62D 25/02* (2013.01); *B62D 25/07* (2013.01); *B62D 27/02* (2013.01); *B62D 27/023* (2013.01); *B62D 27/026* (2013.01)

(58) Field of Classification Search
CPC ........ B62D 25/06; B62D 25/07; B62D 25/02; B62D 27/02; B62D 27/023; B62D 27/026
USPC .................................. 296/210, 203.03, 213
See application file for complete search history.

(56) References Cited

U.S. PATENT DOCUMENTS

| | | | | |
|---|---|---|---|---|
| 6,419,134 B1 * | 7/2002 | Grimm | ................... | B60R 9/058 224/309 |
| 6,616,221 B2 * | 9/2003 | Lumpe | ..................... | B60R 9/04 224/309 |
| 2004/0046423 A1 * | 3/2004 | Wieber | .................. | B62D 25/06 296/203.03 |
| 2016/0362054 A1 * | 12/2016 | Kerscher | ................... | B60R 9/04 |

FOREIGN PATENT DOCUMENTS

JP        11-59490    *   8/1997

\* cited by examiner

*Primary Examiner* — Dennis H Pedder
(74) *Attorney, Agent, or Firm* — Cantor Colburn LLP

(57) ABSTRACT

A vehicle roof panel attachment assembly includes a substructure, a fastening device, a roof panel, and a side panel. The fastening device is engaged to the substructure and projects through an opening in the substructure. The roof panel includes a top portion spaced above the substructure, a flange, and a bend feature disposed between the top portion and the flange. The flange projects, at least in-part, downward from the bend feature and is engaged to the fastening device. The side panel includes an outer segment and an inner segment projecting, at least in-part, downward from the outer segment. A seam is carried by and between the bend feature and the inner segment.

12 Claims, 3 Drawing Sheets

VEHICLE ROOF PANEL ATTACHMENT ASSEMBLY

INTRODUCTION

The subject invention relates to vehicle body panels, and more particularly, to the attachment of roof panels to adjacent side structures.

Vehicle roof panels typically attach to side panels, or side structures, by spot welding, laser welding or laser brazing. In some applications, the seam produced along the welding or brazing region may be a zero gap roof panel to body side fitment, which may generally define a water trough for directing water away from, for example, an open vehicle window. Unfortunately, known welding and brazing techniques may limit the ability to join panels made of dissimilar materials.

Accordingly, it is desirable to provide the ability to continuously join vehicle panels made of different materials along a seam. It is further desirable that the seam be robust, leak-proof, and capable of withstanding stresses that may be produced via vehicle dynamics and/or temperature extremes.

SUMMARY

A vehicle roof panel attachment assembly as one, non-limiting, embodiment of the present disclosure includes a substructure, a fastening device, a roof panel, and a side panel. The fastening device is engaged to the substructure and projects through an opening in the substructure. The roof panel includes a top portion spaced above the substructure, a flange, and a bend feature disposed between the top portion and the flange. The flange projects, at least in-part, downward from the bend feature and is engaged to the fastening device. The side panel includes an outer segment and an inner segment projecting, at least in-part, downward from the outer segment. A seam is carried by and between the bend feature and the inner segment.

Additionally to the foregoing embodiment, the fastening device includes an enlarged base and a peg projecting substantially downward from the enlarged base, through the opening, and is engaged to the substructure.

In the alternative or additionally thereto, in the foregoing embodiment, an end portion of the flange is engaged to the fastening device and is disposed in a first cavity defined by the fastening device.

In the alternative or additionally thereto, in the foregoing embodiment, the fastening device includes a first stanchion projecting substantially upward from the enlarged base for contact with the roof panel.

In the alternative or additionally thereto, in the foregoing embodiment, a second cavity is defined by the stanchion, the top portion, the bend feature, and the flange.

In the alternative or additionally thereto, in the foregoing embodiment, the vehicle roof panel attachment assembly includes an expandable sealer located in the second cavity.

In the alternative or additionally thereto, in the foregoing embodiment, the first cavity is in fluid communication with the second cavity and the first cavity is filled with the expandable sealer.

In the alternative or additionally thereto, in the foregoing embodiment, the vehicle roof panel attachment assembly includes a structural adhesive located between and engaged to the inner segment and a base portion of the flange spanning between the end portion and the bend feature.

In the alternative or additionally thereto, in the foregoing embodiment, the fastening device includes a second stanchion spaced between the first stanchion and the bend feature, and projecting upward for contact with the roof panel.

In the alternative or additionally thereto, in the foregoing embodiment, the vehicle roof panel attachment assembly includes an expandable sealer located in a second cavity defined by the first stanchion, the second stanchion, and the top portion.

In the alternative or additionally thereto, in the foregoing embodiment, the first cavity is in fluid communication with the second cavity and the first cavity is filled with the expandable sealer.

In the alternative or additionally thereto, in the foregoing embodiment, the fastening device includes a second stanchion projecting upward from the base for contact with a base portion of the flange spanning between the end portion and the bend feature.

In the alternative or additionally thereto, in the foregoing embodiment, the first cavity is defined by the base and the first and second stanchions, and the second stanchion is disposed between the end portion and the inner segment.

In the alternative or additionally thereto, in the foregoing embodiment, a water channel is defined by the top portion and the inner segment at the bend feature.

In the alternative or additionally thereto, in the foregoing embodiment, a water channel is defined by the top portion and the inner segment at the bend feature.

In the alternative or additionally thereto, in the foregoing embodiment, the fastening device is made of a non-metallic material.

In the alternative or additionally thereto, in the foregoing embodiment, the roof panel and the side panel are made of different materials.

In the alternative or additionally thereto, in the foregoing embodiment, the inner segment forms into the substructure.

A vehicle roof panel attachment assembly according to another, non-limiting, embodiment includes a substructure, a side panel engaged to the substructure, a fastening device, and a roof panel. A plurality of openings communicate through the substructure. The fastening device including a plurality of pegs and a clip feature. The pegs are press fitted into respective openings of the plurality of openings. The roof panel includes a top portion, a flange, and a bend feature extending between the top portion and the flange. The flange is snap fitted into the clip feature of the fastening device.

A method of assembling a vehicle roof panel attachment assembly according to another, non-limiting, embodiment includes the application of a sealant, in a unexpanded form, upon a fastening device. The fastening device is snap fitted into a substructure. A flange of a roof panel is placed into a slot defined by the fastening device. The sealant is then expanded by heating the vehicle roof panel attachment assembly.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
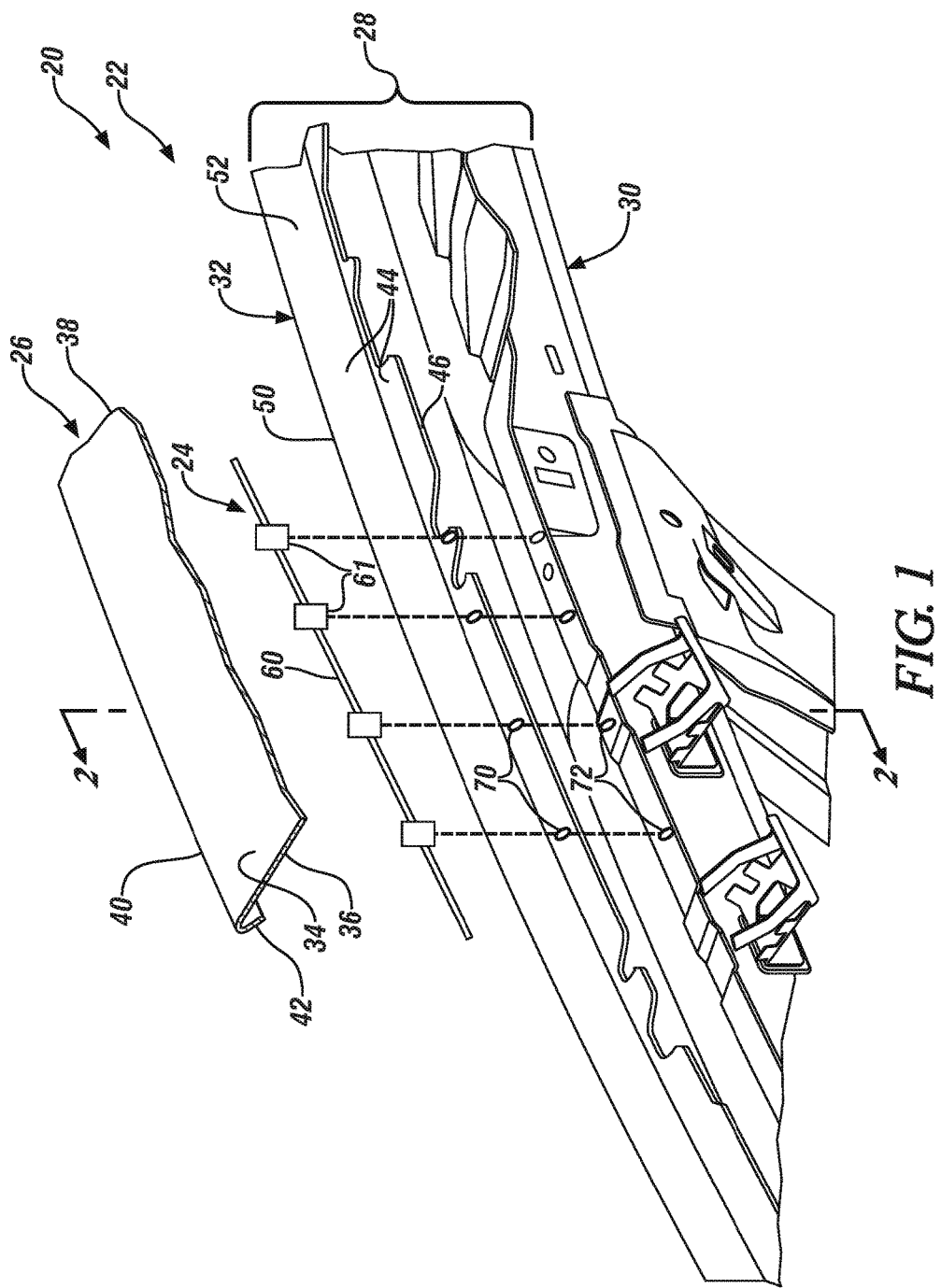
FIG. 1 is an unassembled perspective view of a vehicle panel attachment assembly as one exemplary embodiment of the present disclosure.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the present disclosure, FIG. 1 illustrates a disassembled section of a vehicle 20. The vehicle 20 may include a panel attachment assembly 22 that may generally be an elongated, zero-gap, seam capable of preventing the infiltration of fluids such as water and air. The panel attachment assembly 22 may include a fastening device 24 and at least sections of a first panel 26 that may be a roof panel, and a structure 28. The structure 28 may be a side structure, and may include a substructure 30 and a second panel 32 that may be a side panel. The substructure 30 may provide the structural support and, at least in-part, a means of attaching and holding the panels 26, 32 in place. The roof panel 26, the substructure 30 and the side panel 32 may be made of different materials. For example, the roof panel 26 may be made of aluminum or a non-metallic material, the substructure 30 may be made of steel, and the side panel 32 may be made of a metallic material, or, a non-metallic material such as plastic or a non-metallic composite material. It is further contemplated and understood that the vehicle panels 26, 32 may be any variety of visible body panels on the vehicle 20.

Figure 2:
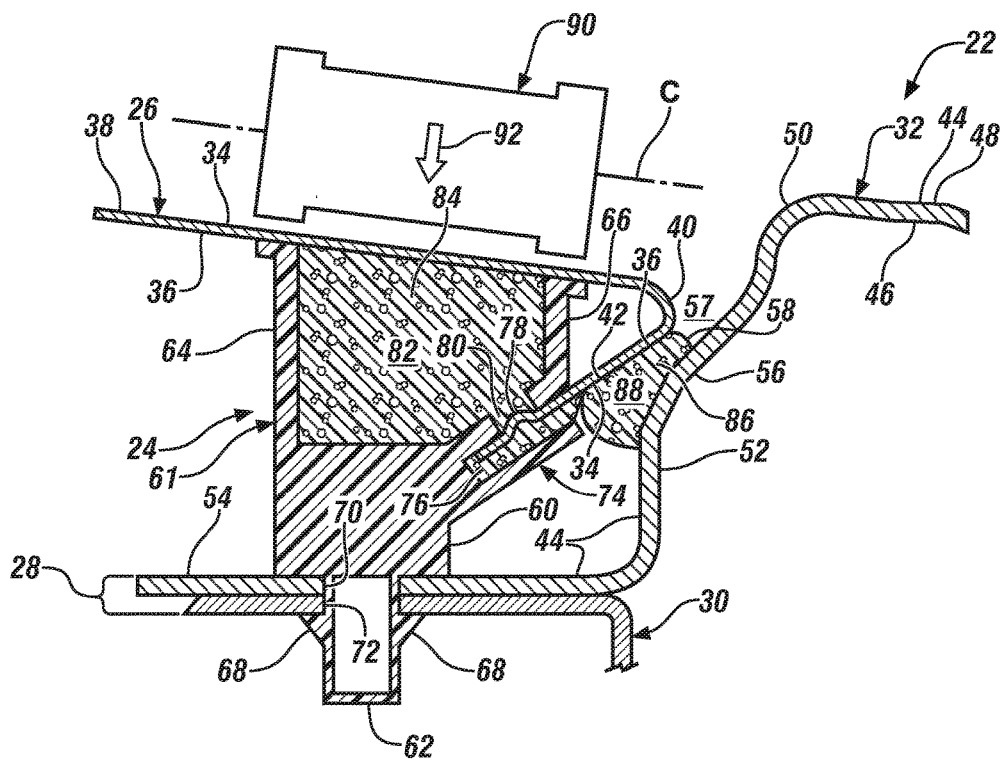
FIG. 2 is a cross section of the vehicle panel attachment assembly viewing in the direction of arrows 2-2 in FIG. 1.

Referring to FIGS. 1 and 2, the roof panel 26 may include opposite surfaces 34, 36, a top portion 38, a bend feature 40, and a flange 42. The portion 38 may be a top portion, may be substantially planar, and may be substantially horizontal. The bend feature 40 generally spans laterally between the top portion 38 and the flange 42. The bend feature 40 may be an acute bend, a chamfer, or other similar feature adapted to substantially eliminate any read-through on the panel 26 that may be a class A surface. It is understood "class A surface" is a term used in automotive design to describe a freeform surface of substantially high efficiency and quality. The term "read-through" is generally any undesired interruption or disturbance in the class A surface. In the example where the bend feature 40 is an acute bend, and when the panel attachment assembly 22 is assembled, the first surface 34 carried by the top portion 38 faces upward and the first surface 34 carried by the flange 42 may face, at least in part, downward. Similarly, the second surface 36 carried by the top portion 38 may face substantially downward, and the second surface 36 carried by the flange 42 may substantially oppose the second surface 36 carried by the top portion 38.

The side panel 32 of the side structure 28 may include opposite faces 44, 46, an outer segment 48, a bend or apex 50, and an inner segment 52. The apex 50 spans between, and generally forms into, the outer and inner segments 48, 52. When the panel attachment assembly 22 is assembled, the portions of the first face 44 carried by the outer segment 48 and carried by the apex 50 may be generally visible. The opposite second face 46 of the side panel 32 may not be visible.

Referring to FIG. 2, the inner segment 52 may include a proximal distal edge region or flange 54 and a contact region 56 that is engaged to and spans between the proximal distal edge region 54 and the apex 50. When assembled, the substructure 30 of the side structure 28 may be spaced below the roof panel 26. The proximal distal edge region 54 of the inner segment 52 may be substantially horizontal and may be disposed above and engaged to the substructure 30. This engagement may be facilitated through, for example, welding, adhesive, rivets, and/or the fastening device 24. It is contemplated and understood that the inner segment 52 may not have a proximal distal edge region 54 and instead, the inner segment 52 may be formed (e.g., stamped) as one, unitary, piece with the substructure 30.

In one embodiment, the contact region 56 of the inner segment 52 may span substantially upward from the proximal distal edge region 54 and the substructure 30. The apex 50 of the side panel 32 may be disposed above the bend feature 40 of the roof panel 26. A water or rain trough 57 may be generally defined by at least the apex 50 of the side panel 32 and the bend feature 40, and/or an adjacent area of the top portion 38 of the roof panel 26. More specifically, the water trough 57 may be located at a seam 58 formed by the close proximity of the apex 50 to the bend feature 40. The seam 58 may be a zero-gap fitment that is resistant to fluid infiltration. That is, the seam 58 may be of a zero-gap construction where the contact region 56 of the inner segment 52 and the bend feature 40 are in contact, or of a construction with a small gap that is filled with either adhesive, sealer, or a mechanical seal.

Referring to FIGS. 1 and 2, the fastening device 24 may include a base 60 that may be elongated, and a multitude of clips 61 spaced along the base 60. Each clip 61 may include a peg 62, a first stanchion 64, and a second stanchion 66. When assembled, the elongated base 60 may co-extend with the seam 58. Each peg 62 of the multitude of clips 61 may project substantially downward from the base 60 and are spaced from one-another along the direction of the seam 58. The first and second stanchions 64, 66 may be elongated strips that co-extend with the base 60, and may project laterally upward from the base 60. In one embodiment, the first and second stanchions 64, 66 are laterally spaced from one-another, with respect to the elongated base 60, and with the second stanchion 66 being located closer to the bend feature 40 of the roof panel 26 than the first stanchion 64. It is contemplated and understood that the contact area between the proximal distal ends of the stanchions 64, 66 and the roof panel 26 may be of a sufficient area to prevent 'read-through' of the panel 26, thus maintaining a visually pleasing panel contour.

The pegs 62 of the fastening device 24 may include snap fit or locking feature(s) 68 that may be barbs projecting radially outward. When the panel attachment assembly 22 is fully assembled the pegs 62 may be press fitted into, and may project through, the openings 70, 72 in the respective proximal distal edge region 54 of the side panel 32 and the substructure 30 (also see FIG. 1). The barbs 68 of the pegs 62 may bear upon an underside of substructure 30 thereby locking the fastening device 24 to the substructure 30 with the proximal distal edge region 54 of the side panel 32 disposed there-between. For tolerance forgiveness, the openings 70 in the proximal distal edge region 54 may be slightly larger than the openings 72 in the substructure 30. The base 60 of the fastening device 24 may be enlarged or may have a lateral girth that is greater than a diameter, or a girth, of the pegs 62 enabling an underside of the base 60 to bear upon the proximal distal edge region 54.

The fastening device 24 may further include a clip feature 74, wherein the base 60 of the fastening device 24 defines boundaries of an opening or slot 76 for receipt of the flange 42 of the roof panel 26. The clip feature 74 may further include a raised tab or index 78 that may snap fit into an opening 80 having boundaries defined by the base 60. The opening 80 is in fluid communication with the slot 76. The opening 80 may communicate between the slot 76 and a cavity 82 having boundaries defined by the base 60, stanchions 64, 66, and the surface 36 carried by the top portion 38 of the roof panel 26. It is contemplated and understood that the fastening device 24 may be longitudinally continuous extending longitudinally with the base 60 with the slot 76 being open in a lateral direction. Alternatively, the clip feature 74 may be longitudinally discontinuous, thereby being a plurality of longitudinally spaced clip features. In this example, each clip feature 74 may be aligned with a respective one of a plurality of tabs 78 of the flange 42.

The panel attachment assembly 22 may further include a first sealant and/or adhesive 84 and a second sealant and/or adhesive 86. The sealant 84 may be an expandable sealant and is located in cavity 82, and may be further located in opening 80 and slot 76 for further adhering the adjacent components together. The adhesive 86 may be located in a cavity or gap 88 having boundaries defined by a portion of surface 34 carried by the flange 42, and an opposing portion of the face 44 carried by the contact region 56.

Figure 3:
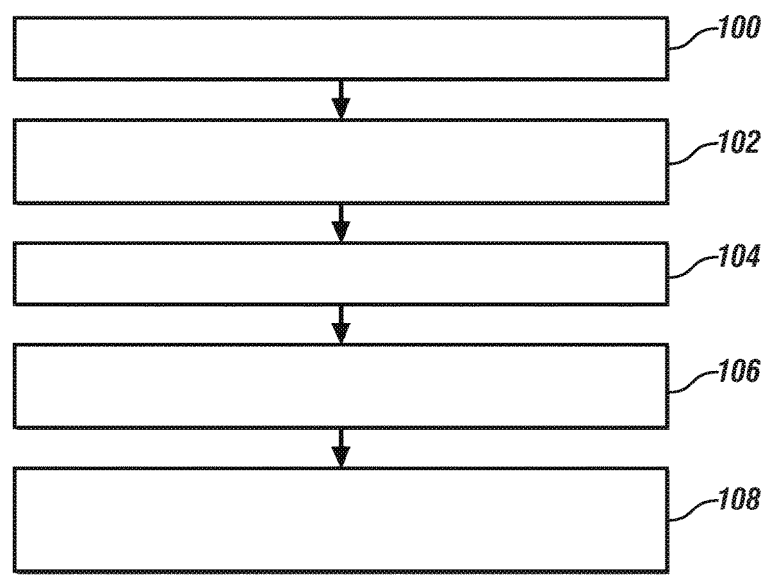
FIG. 3 is a flow chart of a method of assembling the panel attachment assembly.

Referring to FIGS. 2 and 3, a method of assembling the panel attachment assembly 22 is illustrated. At block 100 of FIG. 3, the sealant 84 may be pre-applied to the fastening device 24 in an unexpanded form. At block 102, the adhesive 86 may be applied to one, or both, of the portion of the surface 34 carried by the flange 42 and the portion of the face 44 carried by the contact region 56. At block 104, at least a portion of the flange 42 may be inserted into the slot 76 in the base 60 of the fastening device 24 (e.g., snap fitted). At block 106, the pegs 62 of the fastening device 24 may be inserted through the openings 70, 72 of the respective side panel 32 and the substructure 30, thereby engaging (e.g., snap fitting) the fastening device 24 to the substructure 30. In one embodiment, a tool or roller 90 (see FIG. 2) may be rolled about a centerline C and against the surface 34 carried by the top portion 38 proximate to the bend feature 40 and/or upon regions of the roof panel 26 where the stanchions 64, 66 make contact. As the tool 90 rolls and produces a downward force (see arrow 92 in FIG. 2) exerted upon the top portion 38, the pegs 62 may snap fit into respective substructure openings 72, one-by-one, thereby forming the seam 58. In another embodiment, the assembly 22 may be press fitted. At block 108, the unexpanded sealant 84 and/or the unexpanded sealant or adhesive 86 may be heated to expand the sealants and/or adhesives into at least one of the cavity 82, the opening 80, the slot 76, and the gap 88.

Figure 4:
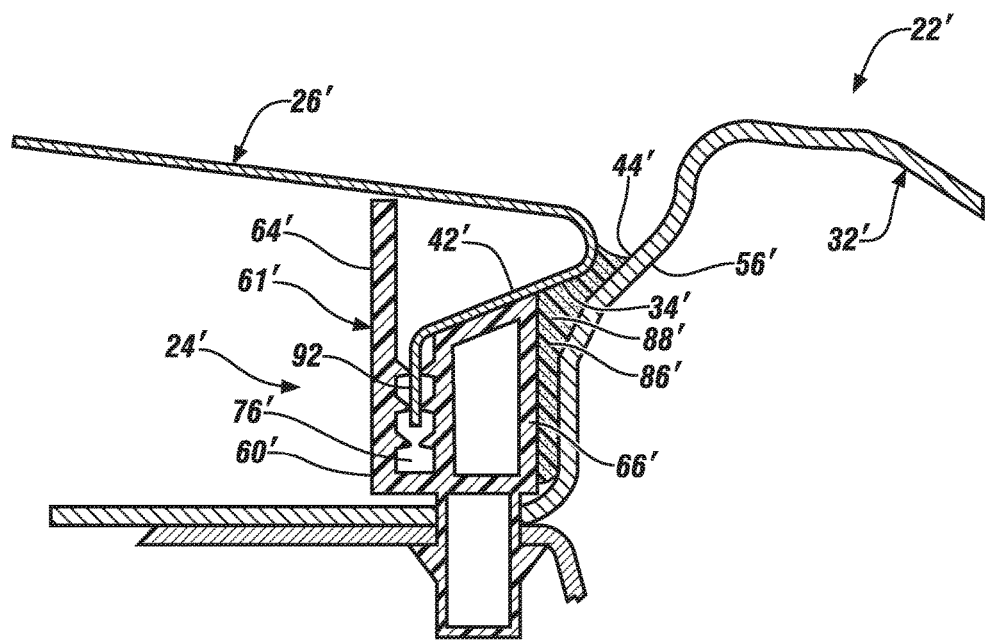
FIG. 4. is a cross section of a second embodiment of a panel attachment assembly.

Referring to FIG. 4, a second embodiment of the panel attachment assembly is illustrated wherein like elements to the first embodiment have like identifying numerals except with the addition of a prime symbol suffix. A panel attachment assembly 22' includes a second stanchion 66' of a fastening device 24' that projects upward from a base 60' and contacts a surface 34' of a flange 42' of a roof panel 26'. The flange 42' includes a proximal distal edge portion 92 that projects substantially vertically and in a downward direction for receipt into a barbed slot 76' that may have boundaries defined by a first stanchion 64' and the second stanchion 66'.

A cavity or gap 88' may have boundaries defined by a portion of the surface 34' carried by the flange 42', the second stanchion 66' and a portion of a face 44' carried by a contact region 56' of a side panel 32'. The gap 88' may be filled by an expandable sealant and/or adhesive 86'. Alternatively, the sealant 86' may generally be a compliant material such as rubber. The compliant material may be pre-molded and secured or adhered to the second stanchion 66' of the clip 61' that may be metallic. In another example, the clips 61' and elongated base 60' may be made of injection molded plastic with the compliant material and/or rubber formed directly to the stanchion 66' during, for example, an injection molding process. In yet another example, the compliant material 86' may be attached to the stanchion 66' via conventional fasteners.

Figure 5:
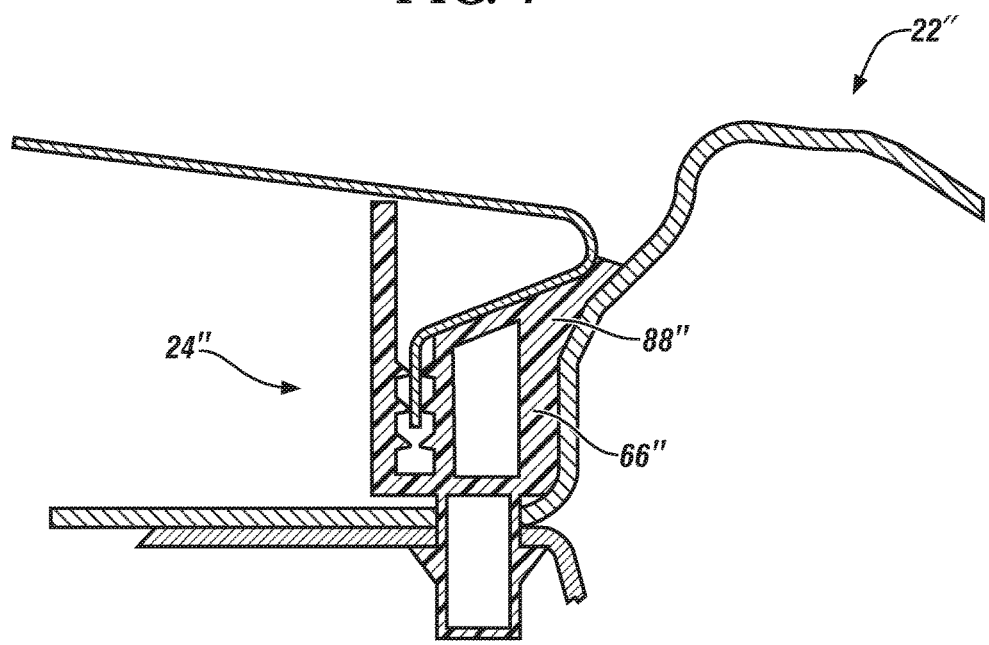
FIG. 5 is a cross section of a third embodiment of a panel attachment assembly.

Referring to FIG. 5, a third embodiment of the panel attachment assembly is illustrated wherein like elements to the second embodiment have like identifying numerals except with the addition of a double prime symbol suffix. A panel attachment assembly 22" includes a second stanchion 66" of a fastening device 24" that generally fills a gap 88".

Benefits and advantages of the present disclosure may include a fastening device that utilizes snap or clip features to secure a roof panel of a vehicle without the use of brazing or welding. The securement facilitates the use of dissimilar material between panels and/or substructures.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle roof panel attachment assembly comprising:
   a substructure including an opening;
   a fastening device engaged to the substructure and projecting through the opening;
   a roof panel including a top portion spaced above the substructure, a flange, and a bend feature disposed between the top portion and the flange, wherein the flange projects at least in-part downward from the bend feature and is directly attached to the fastening device; and
   a side panel including an outer segment and an inner segment projecting at least in-part downward from the outer segment, wherein a seam is carried by and between the bend feature and the inner segment, wherein the fastening device is one unitary piece, and includes an enlarged base and a peg projecting substantially downward from the enlarged base, through the opening, and is engaged to the substructure.

2. The vehicle roof panel attachment assembly set forth in claim 1, wherein the flange is disposed in a first cavity defined by, and internal to, the fastening device.

3. The vehicle roof panel attachment assembly set forth in claim 2, wherein the fastening device includes a first stanchion projecting substantially upward from the enlarged base for contact with the roof panel.

4. A vehicle roof panel attachment assembly comprising:
   a substructure including an opening;
   a fastening device engaged to the substructure and projecting through the opening;

a roof panel including a top portion spaced above the substructure, a flange, and a bend feature disposed between the top portion and the flange, wherein the flange projects at least in-part downward from the bend feature and is engaged to the fastening device; and a side panel including an outer segment and an inner segment projecting at least in-part downward from the outer segment, wherein a seam is carried by and between the bend feature and the inner segment, wherein the fastening device includes an enlarged base and a peg projecting substantially downward from the enlarged base, through the opening, and is engaged to the substructure, wherein the flange is engaged to the fastening device and is disposed in a first cavity defined by the fastening device, wherein the fastening device includes a first stanchion projecting substantially upward from the enlarged base for contact with the roof panel, and wherein a second cavity is defined by the stanchion, the top portion, the bend feature, and the flange.

5. The vehicle roof panel attachment assembly set forth in claim 4 further comprising:

an expandable sealer located in the second cavity.

6. The vehicle roof panel attachment assembly set forth in claim 5, wherein the first cavity is in fluid communication with the second cavity and the first cavity is filled with the expandable sealer.

7. The vehicle roof panel attachment assembly set forth in claim 2 further comprising:

a structural adhesive located between and engaged to the inner segment and the flange.

8. A vehicle roof panel attachment assembly comprising:

a substructure including an opening;

a fastening device engaged to the substructure and projecting through the opening;

a roof panel including a top portion spaced above the substructure, a flange, and a bend feature disposed between the top portion and the flange, wherein the flange projects at least in-part downward from the bend feature and is engaged to the fastening device; and a side panel including an outer segment and an inner segment projecting at least in-part downward from the outer segment, wherein a seam is carried by and between the bend feature and the inner segment, wherein the flange is engaged to the fastening device and is disposed in a first cavity defined by the fastening device, wherein the fastening device includes a first stanchion projecting substantially upward from the enlarged base for contact with the roof panel, and wherein the fastening device includes a second stanchion spaced between the first stanchion and the bend feature, and projecting upward for contact with the roof panel.

9. The vehicle roof panel attachment assembly set forth in claim 8 further comprising:

an expandable sealer located in a second cavity defined by the first stanchion, the second stanchion, and the top portion.

10. The vehicle roof panel attachment assembly set forth in claim 9, wherein the first cavity is in fluid communication with the second cavity and the first cavity is filled with the expandable sealer.

11. A vehicle roof panel attachment assembly comprising:

a substructure including an opening;

a fastening device engaged to the substructure and projecting through the opening;

a roof panel including a top portion spaced above the substructure, a flange, and a bend feature disposed between the top portion and the flange, wherein the flange projects at least in-part downward from the bend feature and is engaged to the fastening device; and a side panel including an outer segment and an inner segment projecting at least in-part downward from the outer segment, wherein a seam is carried by and between the bend feature and the inner segment, wherein the fastening device includes an enlarged base and a peg projecting substantially downward from the enlarged base, through the opening, and is engaged to the substructure, wherein the flange is engaged to the fastening device and is disposed in a first cavity defined by the fastening device, wherein the fastening device includes a first stanchion projecting substantially upward from the enlarged base for contact with the roof panel, and wherein the fastening device includes a second stanchion projecting upward from the base for contact with the flange.

12. The vehicle roof panel attachment assembly set forth in claim 11, wherein the first cavity is defined by the base and the first and second stanchions, and the second stanchion is disposed between the flange and the inner segment.

* * * * *